US011649302B2

(12) United States Patent
Chen et al.

(10) Patent No.: US 11,649,302 B2
(45) Date of Patent: May 16, 2023

(54) MAGNESIUM HALIDE-SUPPORTED TITANIUM (PRO)CATALYSTS

(71) Applicant: Dow Global Technologies LLC, Midland, MI (US)

(72) Inventors: Linfeng Chen, Missouri City, TX (US); Marc A. Springs, Angleton, TX (US); Mehmet Demirors, Pearland, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 17/482,719

(22) Filed: Sep. 23, 2021

(65) Prior Publication Data

US 2022/0010038 A1 Jan. 13, 2022

Related U.S. Application Data

(63) Continuation of application No. 16/329,558, filed as application No. PCT/US2017/052602 on Sep. 21, 2017, now Pat. No. 11,155,650.

(60) Provisional application No. 62/401,353, filed on Sep. 29, 2016.

(51) Int. Cl.
| | | |
|---|---|---|
| C08F 4/654 | (2006.01) | |
| C08F 10/02 | (2006.01) | |
| C08F 4/642 | (2006.01) | |
| C08F 4/659 | (2006.01) | |
| C08F 210/16 | (2006.01) | |

(52) U.S. Cl.
CPC .......... C08F 4/6543 (2013.01); C08F 4/6428 (2013.01); C08F 4/65912 (2013.01); C08F 4/65916 (2013.01); C08F 10/02 (2013.01); C08F 210/16 (2013.01)

(58) Field of Classification Search
CPC .. C08F 4/6543; C08F 4/6428; C08F 4/65912; C08F 4/65916; C08F 10/02; C08F 210/16; B01J 2231/12; B01J 2331/22; B01J 27/08
USPC ................................ 502/115, 117, 226, 227
See application file for complete search history.

(56) References Cited

U.S. PATENT DOCUMENTS

| | | | |
|---|---|---|---|
| 3,113,115 A | 12/1963 | Ziegler et al. | |
| 3,257,332 A | 6/1966 | Ziegler et al. | |
| 4,250,288 A | 2/1981 | Lowery, Jr. et al. | |
| 4,319,011 A | 3/1982 | Lowery, Jr. et al. | |
| 4,547,475 A | 10/1985 | Glass et al. | |
| 4,612,300 A | 9/1986 | Coleman, III | |
| 4,774,301 A | 9/1988 | Campbell, Jr. et al. | |
| 5,070,051 A | 12/1991 | Masi et al. | |
| 5,120,696 A | 6/1992 | Tsutsui et al. | |
| 5,122,491 A | 6/1992 | Kioka et al. | |
| 5,198,399 A | 3/1993 | Hoff et al. | |
| 5,206,199 A | 4/1993 | Kioka et al. | |
| 5,519,098 A | 5/1996 | Brown et al. | |
| 5,539,076 A | 7/1996 | Nowlin et al. | |
| 5,608,018 A | 3/1997 | Ebara et al. | |
| 5,763,349 A | 6/1998 | Zandona | |
| 5,919,983 A | 7/1999 | Rosen et al. | |
| 6,013,743 A | 1/2000 | Tsutsui et al. | |
| 6,034,022 A | 3/2000 | McAdon et al. | |
| 6,511,935 B2 | 1/2003 | Job | |
| 6,723,677 B1 | 4/2004 | Estrada et al. | |
| 6,831,032 B2 | 12/2004 | Spaether | |
| 7,122,691 B2 | 10/2006 | Oshima et al. | |
| 7,592,286 B2 | 9/2009 | Morini et al. | |
| 8,058,373 B2 | 11/2011 | Stevens et al. | |
| 8,299,189 B2 | 10/2012 | Boone et al. | |
| 8,664,343 B2 | 3/2014 | Qin et al. | |
| 8,907,029 B2 | 12/2014 | Wang et al. | |
| 9,255,160 B2 | 2/2016 | Desjardins et al. | |
| 11,155,650 B2 * | 10/2021 | Chen ................ | C08F 4/6428 |
| 2001/0039241 A1 | 11/2001 | Job | |
| 2004/0209764 A1 | 10/2004 | Hamed et al. | |
| 2008/0051534 A1 | 2/2008 | Wang | |
| 2008/0300370 A1 | 12/2008 | Lynch et al. | |
| 2014/0088275 A1 | 3/2014 | Richter-Lukesova et al. | |
| 2016/0046745 A1 | 2/2016 | Wang et al. | |
| 2016/0347681 A1 | 12/2016 | Patil et al. | |
| 2017/0101493 A1 | 4/2017 | Fontaine et al. | |
| 2018/0265604 A1 | 9/2018 | Figueroa et al. | |
| 2018/0282452 A1 | 10/2018 | Fontaine et al. | |
| 2019/0241686 A1 | 8/2019 | Chen et al. | |
| 2019/0241687 A1 | 8/2019 | Chen et al. | |

FOREIGN PATENT DOCUMENTS

| | | |
|---|---|---|
| WO | 1996012762 | 5/1996 |
| WO | 2008022430 | 2/2008 |
| WO | 2008147494 | 12/2008 |
| WO | 2015121842 | 8/2015 |

OTHER PUBLICATIONS

S. Damavandi, et al., FI Catalyst for Polymerization of Olefin, 2012, pp. 117-144, INTECH.
PCT/US2017/052602, International Search Report and Written Opinion dated Nov. 30, 2017.
PCT/US2017/052602, International Preliminary Report on Patentability dated Apr. 2, 2019.

\* cited by examiner

*Primary Examiner* — Patricia L. Hailey

(57) ABSTRACT

A magnesium halide-supported titanium procatalyst, a catalyst prepared therefrom, an enhanced catalyst consists essentially of a product of a reaction of the magnesium halide-supported titanium procatalyst and a hydrocarbylaluminoxane. Also methods of preparing the (pro)catalysts, a method of polymerizing an olefin, and a polyolefin made by the polymerization method.

3 Claims, No Drawings

MAGNESIUM HALIDE-SUPPORTED TITANIUM (PRO)CATALYSTS

FIELD

The field includes olefin polymerization (pro)catalysts, methods of preparing them, methods of polymerizing an olefin, and polyolefins made thereby.

INTRODUCTION

Olefins may be polymerized in gas phase, slurry phase, or solution phase polymerization processes comprising reactions catalyzed by molecular catalysts or Ziegler-Natta catalysts. Molecular catalysts are prepared by contacting molecular procatalysts with an aluminoxane such as methylaluminoxane or boron-based activator such as a perfluorophenyl-boron compound.

Ziegler-Natta catalysts are prepared by contacting Ziegler-Natta procatalysts comprising titanium halides on a magnesium chloride support with an alkylaluminum activator such as triethylaluminum (TEA), triisobutylaluminum (TIBA), diethylaluminum chloride (DEAC), diethylaluminum ethoxide (DEAE), or ethylaluminum dichloride (EADC).

U.S. Pat. No. 4,612,300 to W. M. Coleman, III, mentions a novel catalyst for producing relatively narrow molecular weight distribution olefin polymers. Employs a Ziegler-Natta magnesium halide supported catalyst containing both titanium and vanadium. Catalyst must contain a sufficient quantity of hydrocarbylaluminum, aluminum halide, or combination thereof.

WO 95/11264 A1 to T. E. Nowlin et al. (NOWLIN) mentions polyolefin blends of bimodal molecular weight distribution.

WO 96/12762 A1 to J. A. DeGroot et al. (DEGROOT) mentions polyolefin compositions exhibiting heat resistivity, low hexane-extractives and controlled modulus.

U.S. Pat. No. 6,723,677 B1 to J. V. Estrada et al. (ESTRADA) mentions a high activity Ziegler-Natta catalyst for high molecular weight polyolefins. By controlling the hold-up times, concentrations and temperatures for mixing the components of aluminum, titanium and magnesium based catalyst for solution polymerization it is possible to prepare a catalyst having a high activity, which prepares high molecular weight polyolefins. Generally, a catalyst loses activity and produces lower molecular weight polymer at higher temperatures. The catalyst of [ESTRADA] permits comparable polymers to be produced with higher catalyst activity and at higher reaction temperatures by increasing the concentration of the components used during the preparation of the catalyst.

U.S. Pat. No. 7,592,286 B2 to G. Morini, et al. mentions a process for the preparation of a catalyst component and components therefrom obtained. Catalyst component comprises a Mg compound a Ti compound and an electron donor compound (ED) selected from alcohol, glycols, esters, ketones, amines, amides, nitriles, alkoxysilanes and aliphatic ethers as essential compounds, comprising two or more steps of reaction involving the use of at least one of said essential compounds as fresh reactant alone or in a mixture in which it constitutes the main component, said process being characterized by the fact that in the last of said one or more reaction steps the essential compound used as a fresh reactant is the ED compound.

US 2014/0088275 A1 to L. Richter-Lukesova et al. (LUKESOVA) mentions a process for the manufacture of a mixed catalyst system for the copolymerization of ethylene with C1-C12 alpha-olefins.

U.S. Pat. No. 9,255,160 B2 to S. Desjardins, et al. mentions multi-metallic Ziegler-Natta procatalysts and catalysts prepared therefrom for olefin polymerizations. Catalyst compositions comprising three or more transition metals increase catalyst efficiency, reduce polydispersity, and increase uniformity in molecular weight distribution when used in olefin, and particularly, linear low density polyethylene (LLDPE), polymerizations. Resulting polymers may be used to form films that may exhibit improved optical and mechanical properties.

SUMMARY

For standard Ziegler-Natta procatalysts that are used to prepare catalysts for a gas phase or slurry phase polymerization process, the morphology of the Ziegler-Natta procatalyst particles is important. Preparation of the Ziegler-Natta procatalyst particles may involve at least one step for converting a non-halide titanium compound and/or a non-halide magnesium compound in a first reaction medium into its halide form. It is usually necessary to isolate or separate the resulting Ziegler-Natta procatalyst particles from the first reaction medium before using them to prepare catalysts for the gas phase or slurry phase polymerization process. For standard Ziegler-Natta procatalysts that are used in a solution phase polymerization process, the morphology of the Ziegler-Natta procatalyst particles is not important and the procatalysts may be made by depositing a titanium halide compound on a magnesium chloride support in a second reaction medium. It is usually unnecessary to isolate or separate the resulting Ziegler-Natta procatalyst particles from the second reaction medium before using them to prepare catalysts for the solution phase polymerization process.

We (the present inventors) unexpectedly found that polyolefins with a high molecular weight component can be produced using a procatalyst made by depositing a titanium halide compound on a magnesium chloride support in a one-pot process. The inventive procatalyst may be used to prepare a new magnesium halide-supported titanium catalyst, which has high catalytic activity and is useful for catalyzing polymerizations that produce polyolefin polymers with broad molecular weight distribution (MWD). The catalytic activity of the inventive catalyst is enhanceable if the inventive catalyst is prepared by contacting the inventive procatalyst with an activator that is a hydrocarbylaluminoxane (instead of with a trialkylaluminum or aluminum halide activator, which are required to activate prior Ziegler-Natta procatalysts). A polyolefin made by polymerizing at least one olefin monomer with the inventive catalyst beneficially has a lower residual content of active halide compared to a polyolefin made with a standard halide-containing Ziegler-Natta catalyst. Also provided are methods of preparing the (pro)catalysts, methods of polymerizing olefins, and polyolefins made thereby.

DETAILED DESCRIPTION

The Brief Summary and Abstract are incorporated here by reference. Examples of embodiments include the following numbered aspects.

Aspect 1. An enhanced catalyst that consists essentially of a product of a reaction of (A) a hydrocarbylaluminoxane and a suspension of (B) a magnesium halide-supported titanium procatalyst in (C) a saturated or aromatic hydrocarbon liquid, wherein the (B) magnesium halide-supported titanium procatalyst has been prepared by contacting (D) a solid particulate consisting essentially of magnesium halide with (E) titanium tetrachloride in the (C) a saturated or aromatic hydrocarbon liquid so as to give the (B) magnesium halide-supported titanium procatalyst.

Aspect 2. The enhanced catalyst of aspect 1 wherein: (i) the (B) magnesium halide-supported titanium procatalyst is free of Al; (ii) the (B) magnesium halide-supported titanium procatalyst is characterized by a molar ratio of Al/Mg from >0 to <0.05; (iii) the magnesium halide of the (B) magnesium halide-supported titanium procatalyst is magnesium chloride; (iv) the magnesium halide of the (B) magnesium halide-supported titanium procatalyst is magnesium bromide; (v) both (i) and (iii); (vi) both (i) and (iv); (vii) both (ii) and (iii); (viii) both (ii) and (iv).

Aspect 3. The enhanced catalyst of aspect 1 or 2 wherein: (i) the (D) solid particulate consisting essentially of magnesium halide has a Brunauer, Emmett, Teller (BET) surface area of ≥200 square meters per gram ($m^2/g$) as measured by BET Surface Area Method, described later; or (ii) the (D) solid particulate consisting essentially of magnesium halide has been prepared by contacting a solution of (F) a dialkylmagnesium compound dissolved in the (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid; or (iii) both (i) and (ii).

Aspect 4. The enhanced catalyst of any one of aspects 1 to 3 wherein the (A) hydrocarbylaluminoxane is an alkylaluminoxane, a polymethylaluminoxane, an arylaluminoxane, an aralkylaluminoxane, or a combination of any two or more thereof.

Aspect 5. The enhanced catalyst of any one of aspects 1 to 4 wherein the reaction further comprises contacting the (B) magnesium halide-supported titanium procatalyst with (G) an organoborate or (H) an organoboron.

Aspect 6. A method of preparing an enhanced catalyst, the method comprising contacting (A) a hydrocarbylaluminoxane with a suspension of (B) a magnesium halide-supported titanium procatalyst in (C) a saturated or aromatic hydrocarbon liquid, thereby giving the enhanced catalyst, wherein the (B) magnesium halide-supported titanium procatalyst has been prepared by contacting a suspension of (D) solid particulate consisting essentially of magnesium halide in the (C) saturated or aromatic hydrocarbon liquid with (E) titanium tetrachloride so as to give the suspension of the (B) magnesium halide-supported titanium procatalyst in the (C) saturated or aromatic hydrocarbon liquid.

Aspect 7. The method of aspect 6 further comprising a preliminary step of preparing the (D) solid particulate consisting essentially of magnesium halide by contacting a solution of (F) a dialkylmagnesium compound dissolved in the (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid.

Aspect 8. The method of aspect 7 wherein the (F) dialkylmagnesium compound is diethylmagnesium, dipropylmagnesium, dibutylmagnesium, butyl-ethyl-magnesium, butyl-octyl-magnesium, or a combination thereof.

Aspect 9. A method of polymerizing an olefin using an enhanced catalyst, the method comprising contacting a polymerizable olefin with the enhanced catalyst of any one of aspects 1 to 5 or the enhanced catalyst prepared by the method of any one of aspects 6 to 8 under effective conditions to give a polyolefin product.

Aspect 10. The method of aspect 9 wherein the polymerizable olefin comprises a combination of ethylene and at least one ($C_3$-$C_{40}$)alpha-olefin and the polyolefin product comprises a poly(ethylene-co-($C_3$-$C_{40}$)alpha-olefin) copolymer.

Aspect 11. A magnesium halide-supported titanium procatalyst prepared by contacting (D) a solid particulate consisting essentially of magnesium halide with (E) titanium tetrachloride in (C) a saturated or aromatic hydrocarbon liquid, wherein the (D) solid particulate consisting essentially of magnesium halide has been prepared by contacting a solution of (F) a dialkylmagnesium compound dissolved in (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid; wherein the magnesium halide-supported titanium procatalyst is free of aluminum halides.

Aspect 12. The magnesium halide-supported titanium procatalyst of aspect 11 further comprising (J) a conditioning compound.

Aspect 13. A magnesium halide-supported titanium catalyst that is product of contacting the magnesium halide-supported titanium procatalyst of aspect 11 or 12 with an activator that is a trialkylaluminum compound.

Aspect 14. A method of polymerizing an olefin using a magnesium halide-supported titanium catalyst, the method comprising contacting a polymerizable olefin with the enhanced catalyst of any one of aspects 1 to 5 or the magnesium halide-supported titanium catalyst of aspect 13 under effective conditions to give a polyolefin product.

Aspect 15. The method of aspect 16 wherein the polymerizable olefin comprises a combination of ethylene and at least one ($C_3$-$C_{40}$)alpha-olefin and the polyolefin product comprises a poly(ethylene-co-($C_3$-$C_{40}$)alpha-olefin) copolymer.

Aspect 16. A polyolefin product made by the polymerization method of aspect 9, 10, 14, or 15.

Magnesium halide-supported titanium catalyst. The magnesium halide-supported titanium catalyst is a reaction product of contacting the (B) magnesium halide-supported titanium procatalyst with an activator that is a trialkylaluminum compound. The contacting of the trialkylaluminum compound with the suspension of (B) in (C) may be done in or under an inert atmosphere (e.g., a gas of molecular nitrogen, argon, helium, or mixture thereof) at 0° to 300° C., alternatively 15° to 250° C. and for a time of from >0 minute to 48 hours, alternatively 0.1 minute to 24 hours, alternatively 5 to 120 seconds. Examples of suitable trialkylaluminum compounds are of formula (($C_1$-$C_{20}$)alkyl)$_3$Al, wherein each ($C_1$-$C_{20}$)alkyl is independently the same or different. In some aspects the trialkylaluminum compound is triethylaluminum, triisobutylaluminum, or a combination of any two or more thereof.

Enhanced catalyst. The enhanced catalyst may be made by contacting the (A) hydrocarbylaluminoxane with the suspension of (B) magnesium halide-supported titanium procatalyst in (C) saturated or aromatic hydrocarbon liquid so as to activate the (B) magnesium halide-supported titanium procatalyst and give the enhanced catalyst. The formation of the enhanced catalyst may be done in situ in a polymerization reactor or just prior to entering the polymerization reactor. The contacting of (A) with suspension of (B) in (C) may be done in or under an inert atmosphere (e.g., a gas of molecular nitrogen, argon, helium, or mixture thereof) at 0° to 300° C., alternatively 15° to 250° C. and for a time of from >0 second to 48 hours, alternatively 0.1 minute to 24 hours, alternatively 5 to 120 seconds. The catalytic activity of the enhanced catalyst is greater than the catalytic activity of the magnesium halide-supported titanium catalyst prepared by contacting (B) with the trialkylaluminum compound. In some aspects catalytic activity of the enhanced catalyst may be further enhanced by also contacting (B) and (A) with the (G) organoborate or the (H) organoboron. The enhanced catalyst may consist essentially of, or consist of, the following elements: Al, C, H, Cl, Mg, O, and Ti. The (B) magnesium halide-supported titanium procatalyst, used to make the enhanced catalyst, may consist essentially of, or consist of, the elements Cl, Mg, and Ti.

In some aspects the enhanced catalyst and the (B) magnesium halide-supported titanium procatalyst, used to make the enhanced catalyst, are independently characterized by a molar ratio of Ti to halogen. For example, $0 \leq (N_X-80-4*N_{Ti}) \leq 6$, alternatively $0 \leq (N_X-80-4*N_{Ti}) \leq 4$, alternatively $0 \leq (N_X-80-4*N_{Ti}) \leq 2$; wherein $N_{Ti}$=moles of Ti per 40 moles of Mg in the catalyst and $N_X$=moles of halogen per 40 moles of Mg in the catalyst. In some aspects X is Cl, alternatively Br.

The (A): hydrocarbylaluminoxane or HAO. The alkylaluminoxane may be a polymeric form of a $(C_1-C_{10})$alkylaluminoxane or a polymethylaluminoxane (PMAO). The PMAO may be a polymethylaluminoxane-Improved Performance (PMAO-IP), which is commercially available from AkzoNobel. The $(C_1-C_{10})$alkylaluminoxane may be methylaluminoxane (MAO), a modified methylaluminoxane (MMAO) such as modified methylaluminoxane, type 3A (MMAO-3A), type 7 (MMAO-7), or type 12 (MMAO-12), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, or 1-methylcyclopentylaluminoxane. The arylaluminoxane may be a $(C_6-C_{10})$arylaluminoxane, which may be phenylaluminoxane, 2,6-dimethylphenylaluminoxane, or naphthylaluminoxane. The aralkylaluminoxane may be benzylaluminoxane or phenethylaluminoxane. Typically, the compound (A) is MAO, MMAO, PMAO, or PMAO-IP. The hydrocarbylaluminoxane may be made by a non-hydrolytic process using, or by partial hydrolysis of, trihydrocarbylaluminum compounds according to well-known methods or may be obtained from a commercial source.

The (B) magnesium halide-supported titanium procatalyst. The preparation (B) comprises the step of contacting (D) a solid particulate consisting essentially of magnesium halide with (E) titanium tetrachloride in (C) a saturated or aromatic hydrocarbon liquid to give the (B). The preparation may be done in or under an inert atmosphere (e.g., a gas of molecular nitrogen, argon, helium, or mixture thereof) at 0° to 100° C., alternatively 20° to 35° C. and for a time of from 0.1 minute to 24 hours, alternatively 5 to 12 hours. The suspension of (B) in (C) may be used in the next step without being separated from each other. When prepared in this way it is not necessary to separate the (B) from the (C) and a suspension of the (B) in (C) a saturated or aromatic hydrocarbon liquid may be used directly, in a one-pot syntheses, with the trialkylaluminum compound or the (A) hydrocarbylaluminoxane to prepare the magnesium halide-supported titanium catalyst or the enhanced catalyst, respectively. (In contrast, additional alkylaluminum halide or aluminum halide compound(s) are typically used to prepare a standard (non-inventive) halide-containing Ziegler-Natta catalyst.)

A polyolefin prepared by a polymerization reaction using a standard halide-containing Ziegler-Natta catalyst will have a higher residual active halide content. The actual content may vary within limits as follows: proportionally with the starting halide content in the corresponding standard Ziegler-Natta procatalyst and/or inversely proportional with the activity of the Ziegler-Natta catalyst prepared therefrom. The (B) magnesium halide-supported titanium procatalyst has been prepared in such a way so as to have a low residual active halide content, and thus the magnesium halide-supported titanium catalyst prepared therefrom with the trialkylaluminum compound and the enhanced catalyst prepared therefrom with the (A) hydrocarbylaluminoxane also have low residual active halide content, and thus the product polyolefin prepared by the polymerization method using the magnesium halide-supported titanium catalyst or the enhanced catalyst or the further enhanced catalyst also has low residual active halide content. Active halide impurity means a halide containing compound that, when exposed to moisture or water under ambient conditions (e.g., 25° C. and 101 kPa pressure), undergoes a hydrolysis reaction yielding a hydrogen halide (e.g., HCl).

In some aspects the (B) magnesium halide-supported titanium procatalyst has a total metal content of 94 to 100 mol %, alternatively 96 to 100 mol %, alternatively 98 to 99.5 mol % of Ti and Mg. The suspension of (B) magnesium halide-supported titanium procatalyst in (C) saturated or aromatic hydrocarbon liquid may consist essentially of, or consist of, the following elements: C, H, Cl, Mg, and Ti. The (B) magnesium halide-supported titanium procatalyst in the suspension may consist essentially of, or consist of, the elements: Cl, Mg, and Ti.

The (C) saturated or aromatic hydrocarbon liquid. The (C) saturated or aromatic hydrocarbon liquid may be (i) a saturated hydrocarbon liquid; or (ii) an aromatic hydrocarbon liquid; or (iii) a mixture of saturated hydrocarbon and aromatic hydrocarbon liquids. The compound (C) saturated or aromatic hydrocarbon liquid may be any unsubstituted saturated or aromatic hydrocarbon liquid such as an unsubstituted aromatic hydrocarbon or an unsubstituted alkane. The unsubstituted aromatic hydrocarbon may be toluene or xylene(s). The unsubstituted alkane may be a straight chain alkane, a branched chain alkane such as an isoalkane or mixture of isoalkanes such as ISOPAR E, a cycloalkane such as cycloheptane or methylcyclohexane, or a mixture of any two or more thereof. Suitable (C) saturated or aromatic hydrocarbon liquid are available from commercial sources such as isoalkanes available from ExxonMobil Corp.

In some aspects the (C) saturated or aromatic hydrocarbon liquid in which a first product is prepared may be removed from the first product, and a different (C) material combined with the first product prior to preparing the next product therefrom. The removing may be by methods such as stripping, evaporating, distilling, filtering, or "solvent" exchanging. In other aspects at least some of the (C) saturated or aromatic hydrocarbon liquid in which a first product is prepared is carried through with the first product to a preparation of a next product, which is prepared from the first product, without all or any of the (C) being removed from the first product. This carry through may be accomplished using one-pot preparation methods, which are generally well known in the art. The following examples (i) to (iii) of the latter aspects may use one-pot preparation methods: (i) the (C) saturated or aromatic hydrocarbon liquid in which the (D) solid particulate is prepared (see below) may be the same as the (C) saturated or aromatic hydrocarbon liquid in which the magnesium halide-supported titanium procatalyst is prepared, such as the (C) in which the inventive (B) magnesium halide-supported titanium procatalyst is prepared; (ii) the (C) saturated or aromatic hydrocarbon liquid in which the (B) magnesium halide-supported titanium procatalyst is prepared may be the same as the (C) saturated or aromatic hydrocarbon liquid in which the inventive enhanced catalyst is prepared; or (iii) both examples (i) and (ii).

The (D) solid particulate consisting essentially of magnesium halide. The compound (D) is prepared as described above. The contacting a solution of (F) a dialkylmagnesium compound dissolved in (C) saturated or aromatic hydrocarbon liquid with 1.95 to 2.05 mole equivalents of hydrogen halide to give the (D) solid particulate consisting essentially of magnesium halide may be done in or under an inert atmosphere (e.g., a gas of molecular nitrogen, argon, helium, or mixture thereof) at −25° to 100° C., alternatively 0° to 50° C. and for a time of from 0.1 minute to 10 hours, alternatively 1 to 6 hours. The suspension of (D) in (C) may be used without being separated from each other. It is not necessary to separate the (D) from the (C) and the (D) prepared in this way is unconditioned and may be used directly, in a one-pot syntheses, to prepare the (B) magnesium halide-supported titanium procatalyst. Alternatively, the (D) may be conditioned by contacting it with a conditioning compound containing V, Zr, or Hf at 0° to 50° C., alternatively 20° to 35° C., and for a time of from 0.1 minute to 24 hours, alternatively 1 to 12 hours to form a conditioned (D). The suspension of conditioned (D) in (C) may be used without being separated from each other. It is not necessary to separate the conditioned (D) from the (C) and the conditioned (D) prepared in this way may be used directly, in a one-pot syntheses, to prepare the (B) magnesium halide-supported titanium procatalyst. The contacting of (D) with a conditioning compound may be performed before, during, or after the contacting of (D) with (E) titanium tetrachloride. When prepared in this way a suspension of the (D), unconditioned or conditioned, in (C) saturated or aromatic hydrocarbon liquid may be contacted with (E) titanium tetrachloride so as to give the (B) magnesium halide-supported titanium procatalyst.

The (D) solid particulate consisting essentially of magnesium halide may have a BET surface area of ≥200 m$^2$/g, alternatively >250 m$^2$/g, alternatively >300 m$^2$/g, alternatively >350 m$^2$/g. In some aspects the (D) may have a maximum BET surface area of 1,500 m$^2$/g, alternatively 1,000 m$^2$/g, alternatively 500 m$^2$/g, alternatively 300 m$^2$/g, all as measured by the BET Surface Area Method. When the halide is chloride, the magnesium halide is MgCl$_2$ and when the halide is bromide, the magnesium halide is MgBr$_2$.

The suspension of (D) solid particulate consisting essentially of magnesium halide in (C) saturated or aromatic hydrocarbon liquid may consist essentially of, or consist of, the following elements: C, H, Cl, and Mg. The suspension of (D) may have a halide to magnesium ratio of 1.5 to 2.5, alternatively 1.8 to 2.2, alternatively 1.95 to 2.05.

The (E) titanium tetrachloride is a compound of formula TiCl$_4$, or a solution of TiCl$_4$ in a saturated or aromatic hydrocarbon liquid such as a same or different compound (C) saturated or aromatic hydrocarbon liquid. TiCl$_4$ and the solution thereof are available from commercial sources or may be readily prepared by well-known methods.

The (F) dialkylmagnesium compound may be of formula (I): R$^1$MgR$^2$ (I), wherein each of R$^1$ and R$^2$ is independently an unsubstituted (C$_1$-C$_{20}$)alkyl group, alternatively an unsubstituted (C$_1$-C$_{10}$)alkyl group, alternatively an unsubstituted (C$_1$-C$_4$)alkyl group. In some aspects the dialkylmagnesium compound has an unsubstituted (C$_1$-C$_4$)alkyl group, which is dimethylmagnesium, diethylmagnesium, dipropylmagnesium, isopropyl-methyl-magnesium (i.e., (CH$_3$)$_2$CHMgCH$_3$), dibutylmagnesium, butyl-ethyl-magnesium (i.e., CH$_3$(CH$_2$)$_3$MgCH$_2$CH$_3$), butyl-octyl-magnesium (i.e., CH$_3$(CH$_2$)$_3$Mg(CH$_2$)$_7$CH$_3$), or a combination thereof. Dialkylmagnesium compounds are available commercially or may be readily prepared by well-known methods.

The (G) organoborate. Compound (G) may be any organoborate that enhances the method of polymerization using ethylene monomer. In some aspects (G) is a fluoroorganoborate compound, e.g., a (per)fluoroaryl borate, such as N,N-dimethylanilinium tetrakis(pentafluorophenyl)borate, triphenylcarbenium tetrakis(pentafluorophenyl)borate, N,N-dimethylanilinium tetrakis[3,5-bis(trifluoromethyl)phenyl] borate, or triphenylcarbenium tetrakis[3,5-bis(trifluoromethyl)phenyl]borate, or a mixture of any two or more thereof. In some aspects compound (G) is a methyldi((C$_{14}$-C$_{18}$)alkyl)ammonium salt of tetrakis(pentafluorophenyl)borate, which may be prepared by reaction of a long chain trialkylamine (Armeen™ M2HT, available from Akzo-Nobel, Inc.), HCl and Li[B(C$_6$F$_5$)$_4$]. Such a preparation is disclosed in U.S. Pat. No. 5,919,983, Ex. 2. Or the borate is purchased from Boulder Scientific. The borate may be used herein without (further) purification.

The (H) organoboron. Compound (H) may be any organoboron that enhances the method of polymerization using ethylene monomer. In some aspects compound (H) is a fluoroorganoboron compound In some aspects compound (E) is a tris(perfluoroaryl)borane such as tris(pentafluorophenyl)borane, tris[3,5-bis(trifluoromethyl)phenyl]boron, or a mixture of any two or more thereof.

The (I) trialkylaluminum. The trialkylaluminum may be of formula ((C$_1$-C$_{10}$)alkyl)$_3$Al, wherein each (C$_1$-C$_{10}$)alkyl is independently the same or different. Each (C$_1$-C$_{10}$)alkyl may be methyl, ethyl, propyl, 1-methylethyl, butyl, 1-methylpropyl, hexyl, or octyl. E.g., triethylaluminum, triisobutylaluminum, tripropylaluminum, tributylaluminum, trihexylaluminum, or trioctylaluminum.

The (J) conditioning compound. The (J) conditioning compound may be zirconium-based, hafnium-based, or vanadium based. E.g., tetrakis(2,2,6,6-tetramethyl-3,5-heptanedionato)zirconium, zirconium tetraisopropoxide, tetrakis(2,2,6,6-tetramethyl-3,5-heptanedionato)hafnium, hafnium tetraisopropoxides, vanadium trichloride oxide, or vanadium triisopropoxy oxide. Functions to increase Mz/Mw ratio of product polyolefin produced by the polymerization method relative to Mz/Mw ratio of a product polyolefin produced by the polymerization method lacking (J).

Hydrogen halide. The halide of the hydrogen halide used to prepare the (B) magnesium halide-supported titanium procatalyst is the same as the halide of the magnesium halide of the (B) magnesium halide-supported titanium procatalyst. E.g., both are chloride, alternatively both are bromide. Anhydrous. The mole equivalents of hydrogen halide to (F) dialkylmagnesium compound may be 1.95 to 2.05, alternatively 2.00 to 2.05.

Polymerizable olefin. Examples of suitable polymerizable olefins include ethylene (CH$_2$CH$_2$) and (C$_3$-C$_{40}$)alpha-olefins. The polymerizable olefin may comprise a mixture of ethylene and a (C$_3$-C$_{40}$)alpha-olefin. The (C$_3$-C$_{40}$)alpha-olefin may be from 0.1 wt % to 20 wt %, alternatively from 0.1 to 15 wt %, alternatively 0.1 to 10 wt %, alternatively 0.1 to 5 wt % of the mixture and ethylene the remainder. The ($C_3$-$C_{40}$)alpha-olefin may be a ($C_3$-$C_{20}$)alpha-olefin, alternatively a ($C_3$-$C_{12}$)alpha-olefin, alternatively a ($C_3$-$C_8$)alpha-olefin. Examples of the ($C_3$-$C_8$)alpha-olefin are propene, 1-butene, 1-hexene, and 1-octene. The enhanced catalyst may be used to polymerize ethylene to give a polyethylene. Alternatively, the enhanced catalyst may be used to polymerize a ($C_3$-$C_{40}$)alpha-olefin to give a poly(($C_3$-$C_{40}$)alpha-olefin) polymer. Alternatively, the enhanced catalyst may be used to copolymerize ethylene and at least one ($C_3$-$C_{40}$)alpha-olefin to give a poly(ethylene-co-($C_3$-$C_{40}$)alpha-olefin) copolymer. Polymerizations may be done in any suitable rector such as a batch reactor or in a continuous reactor such as a continuous solution polymerization reactor.

Method of polymerizing an olefin. The magnesium halide-supported titanium catalyst and enhanced catalyst may be independently used as one would use a Ziegler-Natta catalyst to catalyze polymerization of one or more polymerizable olefins. The method may be a slurry process conducted at a temperature from 0° to 100° C. Alternatively, the method may be a gas phase process conducted at a temperature from 30° to 120° C. Alternatively, the method may be a solution process conducted at a temperature from 100° to 250° C. The pressure may be 150 psi to 3,000 psi (1 megapascal (MPa) to 21 MPa).

The method of polymerizing an olefin may be carried out in a reaction mixture containing at least one polymerizable olefin and the magnesium halide-supported titanium catalyst or the enhanced catalyst. The reaction mixture may contain an additional amount of (C) saturated or aromatic hydrocarbon liquid as a diluent or solvent so as to avoid oversaturating the (C) with polymer product, and thereby reducing catalyst efficiency. In some aspects the amount of polymer product in the reaction mixture is less than or equal to 30 wt %. The reaction mixture may be agitated (e.g., stirred) and the temperature of the reaction mixture may be controlled by removing heat of reaction therefrom so as to optimize the polymerization. In the method of polymerizing an olefin the catalyst is used in a catalytically effective amount, such as from 0.0001 to 0.1 milligram-atoms of Ti per liter (L) of the reaction mixture. The method of polymerizing an olefin may be a batch method, semi-continuous method, or a continuous method. The continuous method continuously supplies reactants to the reactor and removes polymer product from the reactor. The semi-continuous method periodically adds reactants to the reactor and periodically removes polymer product from the reactor. The batch method adds reactants to the reactor and then removes polymer product from the reactor after the reaction is finished.

An example of a method of polymerizing uses a stirred-tank reactor, into which the polymerizable olefin(s) are introduced continuously together with any additional amount of (C) (C) saturated or aromatic hydrocarbon liquid. The reactor contains a liquid phase composed substantially of ethylene, and optionally a ($C_3$-$C_{40}$)alpha-olefin, (C) and dissolved polymer product. The catalyst (either one) and/or the (B) magnesium halide-supported titanium procatalyst and (A) hydrocarbylaluminoxane or trialkylaluminum compound, as the case may be, are continuously or intermittently introduced into the reactor liquid phase, or any recycled portion thereof. The reactor temperature and pressure may be controlled by adjusting the solvent/olefin ratio, the catalyst addition rate, as well as by cooling or heating coils, jackets or both. The extent of the reaction may be controlled by the rate of catalyst addition. The ethylene content of the polymer product is determined by the ratio of ethylene to ($C_3$-$C_{40}$)alpha-olefin, if any, in the reactor, which is controlled by manipulating the respective feed rates of these components to the reactor. The polymer product's molecular weight is controlled, optionally, by controlling other polymerization variables such as the temperature, olefin concentration(s), or by feeding molecular hydrogen at a controlled rate into the reactor. If used, the molecular hydrogen may have a concentration of 0.001 to 1 mole percent per 1 mole of ethylene. Upon exiting the reactor, the effluent containing product polymer may be contacted with a catalyst kill agent such as water, steam or an alcohol. The product polymer mixture is optionally heated, and the polymer product recovered by flashing off gaseous or vaporous components such as ethylene, alpha olefin, and component (C), optionally under reduced pressure. If desired, further devolatilization may be done in a devolatilizing extruder. In the continuous process the mean residence time of the catalyst and product polymer in the reactor generally is 1 minute to 8 hours, and alternatively 5 minutes to 6 hours. Alternatively, a continuous loop reactor such as in U.S. Pat. Nos. 5,977,251; 6,319,989; or 6,683,149 and ad rem conditions may be used instead of the stirred tank reactor.

In some aspects the method of polymerizing an olefin is a solution phase process.

Polyolefin product made by the method of polymerizing an olefin. The polyolefin product may be a polymer or copolymer. The polymer may be a homopolymer such as polyethylene or a poly(($C_3$-$C_{40}$)alpha-olefin) polymer such as polypropylene. The copolymer may be a poly(ethylene-co-($C_3$-$C_{40}$)alpha-olefin) copolymer such as a poly(ethylene-co-propene) copolymer, a poly(ethylene-co-1-butene) copolymer, a poly(ethylene-co-1-hexene) copolymer, or a poly(ethylene-co-1-octene) copolymer. The polyethylene may be a high density polyethylene (HDPE), linear low density polyethylene (LLDPE), medium density polyethylene (MDPE), a very low density polyethylene (VLDPE), a high melt strength high density polyethylene (HMS-HDPE), or a combination of any two or more thereof.

The polyolefin polymer or copolymer may further include one or more additives such as antistatic agents, color enhancers, dyes, lubricants, fillers, pigments, primary antioxidants, secondary antioxidants, processing aids, and ultraviolet (UV) light stabilizers. The resulting additive containing polyolefin (co)polymer may comprise from 0 wt % to 10 wt % of each additive, based on the weight of the additive containing polyolefin (co)polymer. Antioxidants, such as Irgafos™ 168 and Irganox™ 1010, may be used to protect the polyolefin (co)polymer from thermal and/or oxidative degradation. Irganox™ 1010 is tetrakis (methylene (3,5-di-tert-butyl-4hydroxyhydrocinnamate) available from Ciba Geigy Inc. Irgafos™ 168 is tris (2,4 di-tert-butylphenyl) phosphite available from Ciba Geigy Inc.

The polyolefin polymer or copolymer made by the method may have a ratio of z-average molecular weight (Mz) to weight average molecular weight (Mw) (Mz/Mw ratio) of ≥3.4. In some aspects the Mz/Mw ratio is at least 3.5, alternatively at least 3.6. In some aspects the Mz/Mw ratio is at most 7.7, alternatively at most 7.0, alternatively at most 6, alternatively at most 4.5. The Mz and Mw may be measured by gel permeation chromatography (GPC) using polystyrene standards according to the below GPC Method.

The polyolefin polymer or copolymer made by the method may have a molecular weight distribution (MWD) of 2.5 to 8.0 Mw/Mn, alternatively of 3 to 7.0 Mw/Mn, alternatively of 3.5 to 6.5 Mw/Mn. The MWD may be measured by the GPC Method described later.

The polymer product may have a weight average molecular weight (Mw) from 50,000 to 300,000 grams/mole (g/mol). The polymer product may have a polymer density from 0.880 to 0.970, alternatively from 0.890 to 0.960 g/cc (gram per cubic centimeter).

The polyolefin product may be used in a forming operation to prepare manufactured articles from or comprising the polyolefin product. Examples of such forming operations are film forming, sheet forming, pipe forming, fiber extruding, fiber co-extruding, blow molding, injection molding, and rotary molding. The manufactured articles prepared thereby may be blown or cast films, such as films formed by co-extrusion or lamination; fibers such as melt spun fibers and melt blown fibers for use in non-woven and woven fabrics; extruded articles; and molded articles. The films may be made as shrink films, cling films, stretch films, sealing films, oriented films, snack packaging films, heavy duty bags, grocery sacks, baked and frozen food packaging, medical packaging, industrial liners, agricultural films, and membranes such as food-contact and non-food-contact membranes. The fibers may be made for use in diaper fabrics, medical garments, and geotextiles. The extruded articles may be made as medical tubing, wire and cable coatings, geomembranes, and pond liners. The molded articles may be made as bottles, tanks, large hollow articles, rigid food containers, and toys.

The aspects herein have numerous advantages. Advantageously, the procatalyst, catalyst prepared therefrom, and polyolefins made therewith have lower levels of residual active halide impurities.

An advantage of aspects is that the enhanced catalyst has a higher catalyst efficiency than a comparative catalyst that is prepared in the same way as the preparation of the enhanced catalyst except, instead of using the (A) hydrocarbylaluminoxane as activator, the preparation of the comparative catalyst contacts the (B) magnesium halide-supported titanium procatalyst with triethylaluminum (TEA) as activator, alternatively with ethylaluminum dichloride (EADC) as activator.

Another advantage of some aspects is that the catalyst efficiency of the enhanced catalyst is further enhanced when aspects of the enhanced catalyst are prepared by contacting the (B) magnesium halide-supported titanium procatalyst with (A) hydrocarbylaluminoxane and the (G) organoborate, alternatively the (H) organoboron.

Some advantages enable the enhanced catalyst to be used with a molecular catalyst, sometimes referred to as a single site catalyst, in a same reactor at the same time, whereas a comparative catalyst that is prepared by contacting a comparative magnesium chloride or comparative magnesium chloride-supported titanium procatalyst with an aluminum halide such as EADC is incompatible with the molecular catalyst.

Another advantage is that when the enhanced catalyst and the molecular catalyst are used in a same reactor at the same time, the resulting polymerization may make polyolefins having a broadened molecular weight distribution (MWD) or a molecular weight distribution that is characterized as being bimodal. A bimodal MWD means that a plot of molecular weight of the macromolecules of the polyolefins would show peaks or maxima at two different molecular weight values.

Another advantage is the magnesium halide-supported titanium procatalyst modified with (A) hydrocarbylaluminoxane and without modification using an aluminum halide produces polyethylenes having a higher Mz/Mw ratio than polyethylenes produced with comparative procatalysts that are modified with aluminum halides. Another advantage of some aspects that further contain the (J) conditioning compound is a further enhanced the Mz/Mw ratio.

The term "activator" may be referred to herein interchangeably as a "co-catalyst" and refers to any compound such as (A), (G), or (I), that reacts with a procatalyst to give a catalyst (catalytically active).

As used here "procatalyst" (also may be referred to as a "precatalyst"), as applied to Ziegler-Natta procatalyst, means a substance that may function as a catalyst in the absence of an activator (A) or (I), but upon activation with an activator (A) or (I) yields a reaction product having at least 10 times greater catalyst efficiency than that of the procatalyst. In contrast molecular procatalysts usually are inactive and are activated with an activator to form the molecular catalysts.

The (D) solid particulate consisting essentially of magnesium halide, and the suspension of (D) in the (C) saturated or aromatic hydrocarbon liquid, and the (B) magnesium halide-supported titanium procatalyst prepared from the (D) solid particulate consisting essentially of magnesium halide, and the suspension of the (B) magnesium halide-supported titanium procatalyst in the compound (C) saturated or aromatic hydrocarbon liquid, and the enhanced catalyst prepared from the suspension of the (B) magnesium halide-supported titanium procatalyst in the compound (C) saturated or aromatic hydrocarbon liquid and the (A) hydrocarbylaluminoxane, collectively "inventive materials", are purer than their counterpart standard materials. The greater purity of the inventive materials is due in part by virtue of how they are respectively prepared, as described earlier, e.g., having a lower active halide impurity content. For example, the respective present methods of preparing the inventive materials (B) and enhanced catalyst avoid using alkylaluminum compounds and aluminum halide compounds, whereas at least some counterpart standard materials may have been prepared using alkylaluminum compounds and aluminum halide compounds, which generate undesired by-products. Also, the preparation of the enhanced catalyst using the (A) hydrocarbylaluminoxane with the inventive suspension of the (B) magnesium halide-supported titanium procatalyst in the compound (C) saturated or aromatic hydrocarbon liquid is an improvement over standard preparations aluminum halide compound. As used herein, the phrases "consisting essentially of" and "consists essentially of" are partially closed-ended phrases that capture the greater purities of the inventive materials and in this context may mean having 0 mol %, alternatively having >0 mol % to <5 mol %, alternatively >0 mol % to <3 mol %, alternatively >0 mol % to <2 mol % of a material other than the listed materials that follow the phrases, or reactants used to prepare those listed materials.

Unless otherwise defined herein, named general terms have the following meanings. Alternatively precedes a distinct embodiment. Articles "a", "an", and "the" each refer to one or more. ASTM means the standards organization, ASTM International, West Conshohocken, Pa., USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). A Markush group of members A and B may be equivalently expressed as: "a member selected from A and B"; "a member selected from the group consisting of A and B"; or "a member A or B". Each member may independently be a subgenus or species of the genus. May confers a permitted choice, not an imperative. NIST is National Institute of Standards and Technology, U.S. Department of Commerce, Gaithersburg, Md., USA. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature is 23° C.±1° C. unless indicated otherwise.

EXAMPLES

Brunauer, Emmett, Teller (BET) Surface Area Method. Measure surface area with a Tristar 3020 Surface Area Analyzer by Micromeritics. Filer 30 mL of a MgCl2 slurry, reslurry in 30 mL hexane, filter the reslurry under inert atmosphere, wash with additional hexane. Repeat the reslurrying, filtering, and washing steps to obtain a filtercake of MgCl2. Remove residual solvent from filtercake under a first vacuum. Further dry the filtercake on a Vac Prep 061 by Micromeritics using a 0.5 inch (1.27 cm) sample tube and a Transeal stopper designed for inert sample protection by loading a 0.2 g sample of the first vacuum-dried MgCl2 into the tube under inert atmosphere and stoppered with Transeal stopper. Connect tube to Vac Prep 061 unit, purging with nitrogen gas while connecting sample. Open Transeal stopper, place tube's contents under second vacuum, place evacuated tube in heating block with an aluminum tube protector. Dry under second vacuum on Vac Prep 061 at 110 C. for 3 hours, introduce nitrogen gas into tube, and allow sample to cool to room temperature before disconnecting tube from Vac Prep 061 to give fully dried sample. Under inert atmosphere, transfer 0.1500 to 0.2000 g of fully dried sample into a clean sample tube, place tube filler rod in tube, seal tube with Transeal stopper, connect to Tristar 3020, and measure surface area. Use QUICKSTART method to acquire the data.

Gel Permeation Chromatography (GPC) Method. Instrument: PolymerChar GPC-IR (Valencia, Spain) high temperature GPC chromatograph equipped with an internal IR5 detector, autosampler, and PolymerChar GPCOne™ software. Temperatures: autosampler oven compartment at 160° C. and column compartment at 150° C. Chromatographic solvent: Nitrogen-sparged 1,2,4 trichlorobenzene that contains 200 parts per million (ppm) of butylated hydroxytoluene (BHT). Injection volume: 200 microliters (µL) Flow rate 1.0 µL/minute. Columns: 3 Agilent "Mixed B" 30 centimeter (cm)×10-micrometer (µm) linear mixed-bed columns and a 10-µm pre-column. Prepare samples using the autosampler targeting 2 milligrams sample per milliliter solvent (mg/mL) in a septa-capped vial that has been nitrogen sparged, and shaking the vial at low speed for 2 hours at 160° C.

GPC Method continued: Calibrate columns with 21 narrow MWD polystyrene (PS) standards from Agilent Technologies and having molecular weights (MW) 580 to 8,400,000 g/mol and arranged in 6 "cocktail" mixtures with at least a decade separation between Mw. Prepare PS standards at 0.025 g in 50 milliliters (mL) of solvent for MW≥1,000,000 g/mol and 0.05 g/mL solvent for MW<1,000,000 g/mol. Convert PS standard peak MW to polyethylene MW as described in Williams and Ward, J. Polym. Sci., Polym. Lett., 1968; 6: 621, using Equation EQ1: $M_{polyethylene} = A \times (M_{polystyrene})^B$ EQ1, wherein M is molecular weight, A equals 0.4315, and B equals 1.0. Use fifth order polynomial t fit respective polyethylene-equivalent calibration points. Make a small adjustment to A (from about 0.415 to 0.44) to correct for column resolution and band-broadening effects such that MW for NIST standard NBS 1475 is obtained at 52,000 g/mol. Monitor deviations over time using a flow rate marker, e.g., decane, in each sample (introduced via micropump) to align flow rate marker peak from sample to flow rate marker peak of PS standards. Use flow rate marker to linearly correct flow rate for each sample by aligning respective sample flow rate marker peaks to respective PS standards flow rate marker peaks. Assume any changes in time of the flow rate marker peak are related to a linear shift in flow rate and chromatographic slope. For best accuracy of RV measurement of the flow rate marker peak, use a least-squares fitting routine to fit the flow rate marker peak of a flow rate marker concentration chromatogram to a quadratic equation. Use PolymerChar GPCOne™ software to process flow rate marker peak.

GPC Method continued: Measure total plate count (Equation EQ2) and symmetry (Equation EQ3) of GPC columns with 0.04 g eicosane dissolved in 50 mL of TCB. EQ2: Plate Count=$5.54 \times [(RV_{Peak\ Max})$ divided by (Peak Width at ½ height)$]^2$, wherein RV is retention volume (mL), peak width is in mL, peak max is maximum height of peak, and ½ height is half height of peak maximum.

$$\text{Symmetry} = \frac{(\text{Rear Peak } RV_{onetenthheight} - RV_{Peakmax})}{(RV_{Peakmax} - \text{Front Peak } RV_{onetenthheight})}, \quad \text{EQ3}$$

wherein RV and peak width are as defined above, peak max is the maximum position of the peak, one tenth height is 1/10 height of the peak maximum, rear peak is the peak tail at later retention volumes than those of the peak max, and front peak refers to the peak front at earlier retention volumes than the peak max. Plate count should be >24,000 and symmetry should be >0.98 to <1.22.

GPC Method continued: Calculate number average molecular weight (Mn), weight average molecular weight (Mw), and z-average molecular weight (Mz) from GPC results from using internal IR5 detector (measurement channel) of the PolymerChar GPC-IR instrument and PolymerChar GPCOne™ software. Baseline-subtract the IR chromatogram at each equally-spaced data collection point (i), and obtain the polyethylene equivalent Mn, Mw, and Mz from the narrow standard calibration curve for the same point (i) from EQ1.

Catalyst efficiency ("Cat. Eff."): calculate Cat. Eff. based on the amount of ethylene consumed during polymerization per gram of Ti in the magnesium halide-supported titanium procatalyst (g ethylene/g Ti).

Batch reactor. A stirred 1-gallon reactor having a bottom valve.

Batch Reactor Copolymerization Test Method. Charge batch reactor with 250 g of 1-octene and 1330 g of Isopar E. Heat rector contents to 190° C., then saturate contents with ethylene in presence of 40 millimoles (mmol) of molecular hydrogen. Mix suspension of catalyst (e.g., (B1) or (B2)) in liquid (e.g., (C1)) and activator (e.g., (A1)) in separate flask, and immediately add resulting mixture into the batch reactor. Maintain pressure in the reactor at 3100 kilopascals (kPa; equal to 450 pounds per square inch (psi)) with ethylene flow to compensate for pressure drop due to ethylene consumption during polymerization thereof. After 10 minutes reaction time, open bottom valve and transfer reactor contents into a glass kettle. Pour contents of kettle onto a Mylar lined tray, allow contents to cool, and place tray in fume hood overnight to evaporate most of the liquid.

Dry remaining resin in a vacuum oven to give a product poly(ethylene-co-1-octene) copolymer.

Continuous solution polymerization reactor. Reactor contains a liquid full, adiabatic, and continuously stirred tank reactor (CSTR) having an agitator and being in inbound fluid communication with heat exchangers for controlling temperatures of feeds and being in outbound sequential fluid communication with a deactivation zone and devolatilization system. Inject total (combined) feed of monomer, comonomer, and solvent into the CSTR in one location. Inject (pre)catalyst into the CSTR separately from other feeds. Continuously agitate reactor contents and control reactor temperature using an oil bath.

Single Reactor Continuous Copolymerization Test Method. Before use, purify monomer (e.g., ethylene), comonomer (e.g., 1-octene) if any, and solvent (Isopar E or a narrow boiling range high-purity paraffinic and cycloparaffinic solvent) with molecular sieves. Pressurize a monomer feed via a mechanical compressor to above reaction pressure. Separately pressurize solvent feed and comonomer feed via pumps to above reaction pressure. Combine monomer feed, comonomer feed, solvent feed, and a molecular hydrogen feed, and introduce the resulting combination into a single continuous reactor. Manually batch dilute titanium procatalysts (B1) or (B2) separately with purified solvent, and pressurize dilutions to above reaction pressure. Use activator (A1). Measure all reaction feed flows with mass flow meters and independently control them with metering pumps. Remove effluent from the reactor into the deactivation zone, add a deactivating reagent (e.g., water) to the effluent in the deactivation zone, and send the resulting deactivated effluent into the devolatilization system. Devolatilize the deactivated effluent by separating (co)polymer from a non-polymer stream. Collect and pelletize the separated (co)polymer to give the (co)polymer as an isolated pelletized product.

Hydrocarbylaluminoxane (A1). Modified methylaluminoxane, type 3A (MMAO-3A) having an approximate molecular formula $[(CH_3)_{0.7}(isoC_4H_9)_{0.3}AlO]$. CAS No. 146905-79-5. Obtained as a solution in heptane from AkzoNobel N.V.

Compound (C1). Isopar E fluid. >99.75% to 99.9% of naphtha (petroleum), light alkylate, CAS 64741-66-8, and 0.1 to <0.25% isooctane CAS 540-54-1, (isoalkanes mixture) obtained from Exxon Mobil Corporation. Having boiling range 114° to 139° C.

Particulate $MgCl_2$ (D1). Solid particulate $MgCl_2$ having a BET surface area of 375 to 425 $m^2/g$. Product prepared by diluting a 20 wt % solution of (F1), described below, in heptane into a measured quantity of (C1) to give a diluted solution; adding hydrogen chloride (HCl) slowly to the diluted solution with agitation at 30° C. until the molar ratio of Cl to Mg reaches 2.04:1.00 while maintaining the temperature at 30 ° ±3° C., to give a 0.20 M suspension of (D1) in (C1).

Titanium tetrachloride (E1). $TiCl_4$ obtained from Sigma-Aldrich Corporation

Dialkylmagnesium (F1). Butyl-ethyl-magnesium. A 20 wt % solution in heptane.

Organoborate (G1). Methyldi(($C_{14}$-$C_{18}$)alkyl)ammonium salt of tetrakis(pentafluorophenyl)borate, prepared as described earlier. A mixture in a cycloalkane.

Alkylaluminum dichloride (I2): ethylaluminum dichloride (EDAC). $(CH_3CH_2)AlCl_2$ solution in heptane.

Zirconium-based conditioning compound (J1): tetrakis(2,2,6,6-tetramethyl-3,5-heptanedionato)zirconium (Zr(TMHD)$_4$).

For the following examples, Ti loading, molar ratio of activator (e.g., TEA) or activator (e.g., (G1)) to titanium ("activator/Ti"), process conditions and data are listed later Table 1.

Inventive Example 1 (IE1): Magnesium chloride-supported titanium procatalyst (B1). Add 0.80 milliliter (mL) of 0.25 Molar (M) solution of (E1) in (C1) to 40 mL of 0.20 M suspension of (D1) in (C1), and stir the resulting mixture overnight to give (B1) suspended in (C1).

Inventive Example 2 (1E2): Magnesium chloride-supported titanium procatalyst (B2). Add 2.40 mL of a 0.25 M solution of (E1) in (C1) to 40 mL of the 0.20 M suspension of (D1) in (C1), and stir the resulting mixture overnight to give (B2) suspended in (C1).

Inventive Example 3A (IE3A): enhanced catalyst. Add 0.40 mL of a 0.125 M solution of (A1) MMAO-3A in heptane to a suspension of IE1 to give enhanced catalyst of IE3.

Inventive Example 3B (IE3B): enhanced catalyst. Add 0.24 mL of a 0.125 M solution of (A1) MMAO-3A in heptane and 0.24 mL of a 0.003 M solution of (G1) in methylcyclohexane to a suspension of IE1 to give enhanced catalyst of IE3B.

Inventive Example 3C (IE3C): enhanced catalyst. Add 0.50 mL of a 0.125 M solution of (A1) MMAO-3A in heptane to a suspension of IE1 to give enhanced catalyst of IE3.

Inventive Example 3D (IE3D): enhanced catalyst. Add 0.98 mL of a 0.125 M solution of (A1) MMAO-3A in heptane to a suspension of IE1 to give enhanced catalyst of IE3.

Inventive Example 4A (IE4A): enhanced catalyst. Add 0.57 mL of a 0.125 M solution of (A1) MMAO-3A in heptane to a suspension of IE2 to give enhanced catalyst of IE4A.

Inventive Example 4B (IE4B) (prophetic): enhanced catalyst. Replicate the procedure of IE3B except the suspension of IE2 instead of a suspension of IE1 to give enhanced catalyst of IE4B.

Inventive Example 4C (IE4C): enhanced catalyst. Add 1.42 mL of a 0.125 M solution of (A1) MMAO-3A in heptane to a suspension of IE2 to give enhanced catalyst of IE4C.

Inventive Example 4D (IE4D): enhanced catalyst. Add 0.20 mL of a 1.77 M solution of (A1) MMAO-3A in heptane to a suspension of IE2 to give enhanced catalyst of IE4D.

Inventive Examples 5A, 5B, 6A, 7A, 8A, 9A, and 10A (IE5A, IE5B, IE6A, IE6B, IE7A, IE8A, IE9A, and IE10A). Replicate the Batch Reactor Copolymerization Test Method separately with different ones of the enhanced catalysts of IE3A, IE3B, IE4A, IE3C, IE3D, IE4C, and IE4D, respectively and determine data for catalyst efficiency (Cat. Eff.) and molecular weight ratio Mz/Mw according to the methods described earlier.

Comparative Example 1 (CE1), 2 (CE2), and 3 (CE3): separately replicate the procedures of IE3A (for CE1) and IE 4A (for CE2 and CE3) except instead of the solution of (A1) add instead 0.34 mL of a 0.05 M solution of TEA, 1.42 mL of a 0.05 M solution of TEA, or 0.21 mL of a 1.03 M solution of TEA in heptane to separately give the comparative catalysts of CE1, CE2 and CE3, respectively.

Comparative Examples 4 to 6 (CE4 to CE6). Replicate the Batch Reactor Copolymerization Test Method separately with different ones of the comparative catalysts of CE1, C2, and CE3, and determine data for catalyst efficiency (Cat. Eff.) and molecular weight ratio Mz/Mw according to the methods described earlier.

TABLE 1

Batch Reactor Copolymerization Test Method.

| Ex. No. | Cat. | Ti loading (mmol) | Activator | Activator/Ti (mol/mol) | (G1) (y/n) | Cat. Eff. | Mz/Mw |
|---|---|---|---|---|---|---|---|
| CE4 | CE1 | 0.0017 | TEA | 10 | No | 253125 | 3.49 |
| CE5 | CE2 | 0.0071 | TEA | 10 | No | 122332 | 3.67 |
| CE6 | CE3 | 0.0071 | TEA | 30 | No | 102322 | 3.55 |
| IE5A | IE3A | 0.0049 | (A1) | 10 | No | 493922 | 3.58 |
| IE5B | IE3B | 0.0030 | (A1) | 10 | Yes | 713462 | 4.29 |
| IE6A | IE4A | 0.0071 | (A1) | 10 | No | 343287 | 3.60 |
| IE7A | IE3C | 0.0025 | (A1) | 25 | No | 629804 | 3.48 |
| IE8A | IE3D | 0.0025 | (A1) | 50 | No | 560005 | 3.49 |
| IE9A | IE4C | 0.0071 | (A1) | 25 | No | 241568 | 3.74 |
| IE10A | IE4D | 0.0071 | (A1) | 50 | No | 231525 | 3.59 |

The data in Table 1 show the enhanced catalyst has a higher catalyst efficiency than the comparative catalysts. An aspect of the low Ti content procatalyst of IE1 has further enhanced catalyst efficiency with the (G) organoborate. The data show that the magnesium halide-supported titanium procatalyst can be activated with a hydrocarbylaluminoxane or an organoborate activator, as is done with a molecular catalyst, which allow these catalysts to be used simultaneously in a same reactor.

For the following examples, Ti loading, molar ratio of activator to TI or activator/Ti, process conditions and data are listed later Table 2.

Comparative Example 7 (CE7). Magnesium chloride-supported titanium procatalyst (B3). (B3) is the 0.20 M suspension of (D1) in (C1) prepared in (D1) above combined with (I2) and then (E1) such that (B3) has a molar ratio of (D1)(I2)/Ti of 40/10/1.

Inventive Example 11 (IE11). Magnesium chloride-supported titanium procatalyst (B4). (B4) is the 0.20 M suspension of (D1) in (C1) prepared in (D1) above combined with a measured quantity of (E1) such that (B3) has a molar ratio of (D1)/Ti of 40/1.

Comparative Example 8 (CE8). Magnesium chloride-supported titanium procatalyst (B5). Combine a measured quantity of catalyst (B3) of CE7 with a measured quantity of (J1) to give magnesium chloride-supported titanium procatalyst (B5) having a molar ratio of (J1)/(D1) of 0.5/40.

Inventive Example 12 (IE12). Magnesium chloride-supported titanium procatalyst (B6). Combine a measured quantity of catalyst (B4) of IE11 with a measured quantity of (J1) to give magnesium chloride-supported titanium procatalyst (B6) having a molar ratio of (J1)/(D1) of 0.5/40.

Comparative Example 9 and Inventive Example 13. Replicate the Single Reactor Continuous Copolymerization Test Method separately with different ones of the comparative procatalyst of CE8 and enhanced procatalyst of IE12, respectively and determine data for molecular weight ratio Mz/Mw according to the methods described earlier. Feed temperatures of 19.8° C. (CE9) or 20.8° C. (IE13); feed solvent/ethylene mass flow ratio (g/g) 6.1 (both); feed comonomer/ethylene mass flow ratio (g/g) 0.94 (both; feed hydrogen/ethylene mass flow ratio (g/g) 0 (both); reactor temperature 185.1° C. (CE9) or 184.5° C. (IE13); and pressure (kPa gauge) 2,000 (28 bar gauge). Record ethylene conversion in percent (%).

TABLE 2

Single Reactor Continuous Copolymerization Test Method.

| Ex. No. | Pro-Cat. | TEA/Ti (mol/mol) | EADC (y/n) | Ethylene Convers. (%) | Mz/Mw |
|---|---|---|---|---|---|
| CE9 | CE8 | 13.0 | Yes | 89.0 | 3.95 |
| IE13 | 1E12 | 12.0 | No | 89.9 | 7.23 |

The data in Table 2 show the inventive magnesium halide-supported titanium catalyst produces polyethylene having a much higher Mz/Mw ratio (IE13) than polyethylene produced with the comparative catalyst with aluminum halides (CE9). The Mz/Mw data in Table 2 for IE13 relative to the Mz/Mw data in Table 1 for IE5A also show that the (J) conditioning compound further enhanced the Mz/Mw ratio.

The invention claimed is:

1. An enhanced catalyst that consists essentially of a product of a reaction of (A) a hydrocarbylaluminoxane and a suspension of (B) a magnesium halide-supported titanium procatalyst in (C) a saturated or aromatic hydrocarbon liquid, wherein the (B) magnesium halide-supported titanium procatalyst has been prepared by contacting (D) a solid particulate consisting essentially of magnesium halide with (E) titanium tetrachloride in the (C) saturated or aromatic hydrocarbon liquid so as to give the (B) magnesium halide-supported titanium procatalyst; wherein the reaction further comprises contacting the (B) magnesium halide-supported titanium procatalyst with (G) an organoborate, wherein the (G) organoborate is (G1) Methyldi(($C_{14}$-$C_{18}$)alkyl)ammonium salt of tetrakis(pentafluorophenyl)borate.

2. The enhanced catalyst of claim 1 wherein: (i) the (D) solid particulate consisting essentially of magnesium halide has a Brunauer, Emmett, Teller (BET) surface area of ≥200 square meters per gram ($m^2$/g) as measured by BET Surface Area Method; or (ii) the (D) solid particulate consisting essentially of magnesium halide has been prepared by contacting a solution of (F) a dialkylmagnesium compound dissolved in the (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid; or (iii) both (i) and (ii); and wherein the mole equivalent of the hydrogen halide to the (F) dialkylmagnesium compound is from 2.00 to 2.05.

3. A method of preparing an enhanced catalyst, the method comprising contacting (A) a hydrocarbylaluminoxane with a suspension of (B) a magnesium halide-supported titanium procatalyst in (C) a saturated or aromatic hydrocarbon liquid, thereby giving the enhanced catalyst, wherein the (B) magnesium halide-supported titanium procatalyst has been prepared by contacting a suspension of (D) solid particulate consisting essentially of magnesium halide in the (C) saturated or aromatic hydrocarbon liquid with (E) titanium tetrachloride so as to give the suspension of the (B) magnesium halide-supported titanium procatalyst in the (C) saturated or aromatic hydrocarbon liquid; wherein the reaction further comprises contacting the (B) magnesium halide-supported titanium procatalyst with (G) an organoborate;

further comprising a preliminary step of preparing the (D) solid particulate consisting essentially of magnesium halide by contacting a solution of (F) a dialkylmagnesium compound dissolved in the (C) saturated or aromatic hydrocarbon liquid with 1.95 to 2.05 mole equivalents of hydrogen halide to give a suspension of the (D) solid particulate consisting essentially of magnesium halide in the (C) saturated or aromatic hydrocarbon liquid;
wherein the mole equivalent of the hydrogen halide to the (F) dialkylmagnesium compound is from 2.00 to 2.05.

* * * * *